US 9,870,798 B2

(12) United States Patent
Pribula

(10) Patent No.: US 9,870,798 B2
(45) Date of Patent: Jan. 16, 2018

(54) INTERACTIVE REAL-TIME VIDEO EDITOR AND RECORDER

(71) Applicant: FreshTake Media, Inc., Menlo Park, CA (US)

(72) Inventor: Alexis Juri Pribula, Menlo Park, CA (US)

(73) Assignee: FRESHTAKE MEDIA, INC., Menlo Park, CA (US)

(*) Notice: Subject to any disclaimer, the term of this patent is extended or adjusted under 35 U.S.C. 154(b) by 0 days.

(21) Appl. No.: 15/237,908

(22) Filed: Aug. 16, 2016

(65) Prior Publication Data
US 2016/0358629 A1 Dec. 8, 2016

Related U.S. Application Data

(63) Continuation of application No. 14/268,502, filed on May 2, 2014.
(Continued)

(51) Int. Cl.
*H04N 5/77* (2006.01)
*G11B 27/031* (2006.01)
(Continued)

(52) U.S. Cl.
CPC ........ *G11B 27/031* (2013.01); *G06K 9/00718* (2013.01); *H04N 5/77* (2013.01);
(Continued)

(58) Field of Classification Search
CPC ...... H04N 5/772; H04N 5/232; H04N 5/9201; H04N 1/2112; G11B 27/34
(Continued)

(56) References Cited

U.S. PATENT DOCUMENTS

| 8,572,646 B2 * | 10/2013 | Haberman ........... G11B 27/031 705/14.49 |
| 9,031,382 B1 * | 5/2015 | Kaiser .................... G11B 27/00 386/248 |
| 2012/0063736 A1 | 3/2012 | Simmons et al. |

FOREIGN PATENT DOCUMENTS

| JP | 2006-135706 A | 5/2006 |
| KR | 20130026609 A | 3/2013 |
| WO | 2010126224 A2 | 11/2010 |

OTHER PUBLICATIONS

International Search Report and Written Opinion dated Sep. 30, 2014, for International Application No. PCT/US2014/036666 filed May 2, 2014, 6 pages.

* cited by examiner

*Primary Examiner* — William C Vaughn, Jr.
*Assistant Examiner* — Daniel Tekle
(74) *Attorney, Agent, or Firm* — Perkins Coie LLP

(57) ABSTRACT

Embodiments of a video management system and related methods for are disclosed. The video management system analyzes the user's movement while recording video to delimit video shots. For example, it interprets a "Shake to Cut" gesture, which would have the same effect as a movie director shouting "Cut!" on a movie set. The video management system also allows continuous interaction between a video shooter and other users while recording video. The video montages created with the video management system can be seen as integrating qualitative human judgment relating to meaning, storyline, emotion, etc. Video metadata collected with the video management system can also be used to facilitate interactions on scalable crowd-sourced social video-editing platforms. For example, any video montage created with the video management system could be modified and used as a video template, where other users keep all the video editing information but replace the video footage.

11 Claims, 10 Drawing Sheets

Related U.S. Application Data

(60) Provisional application No. 61/818,875, filed on May 2, 2013.

(51) Int. Cl.
*H04N 21/2743* (2011.01)
*H04N 21/422* (2011.01)
*H04N 21/472* (2011.01)
*H04N 5/91* (2006.01)
*H04N 21/4223* (2011.01)
*H04N 9/82* (2006.01)
*H04N 21/436* (2011.01)
*H04N 21/4788* (2011.01)
*G06K 9/00* (2006.01)

(52) U.S. Cl.
CPC ............... *H04N 5/772* (2013.01); *H04N 5/91* (2013.01); *H04N 9/8205* (2013.01); *H04N 9/8211* (2013.01); *H04N 21/2743* (2013.01); *H04N 21/4223* (2013.01); *H04N 21/42203* (2013.01); *H04N 21/42225* (2013.01); *H04N 21/43615* (2013.01); *H04N 21/4788* (2013.01); *H04N 21/47205* (2013.01)

(58) Field of Classification Search
USPC ........................................................ 386/227
See application file for complete search history.

INTERACTIVE REAL-TIME VIDEO EDITOR AND RECORDER

RELATED APPLICATIONS

The present application is a continuation of U.S. Non-Provisional patent application Ser. No. 14/268,502. The present application claims priority to and benefit from U.S. Provisional Patent Application No. 61/818,875, titled "Interactive On-the-fly Video Editing while Recording Video, and Related Social Video Components" and filed on May 2, 2013, and U.S. Non-Provisional patent application Ser. No. 14/268,502 filed on May 2, 2014. The entire content of the aforementioned applications is herein expressly incorporated by reference.

TECHNICAL FIELD

The technology is related to interactive video editing while recording video. Further, additional technology is related to social video platform components.

BACKGROUND

Many people can record video on their electronic devices but the unaltered result of this recording is often of poor quality compared to professionally created and edited video content. After people record video, they rarely spend time editing because the process is so time consuming. For example, it can take a video professional one hour to edit a five minute long video montage with existing software. Additionally, it can be hard to collaborate on a massive scale on the editing of video.

SUMMARY

Certain embodiments of a method for creating a video montage are disclosed. According to the embodiments, the method is comprised of capturing a video using an electronic device, while simultaneously capturing sensor data with that electronic device. Further, the method detects, from the captured sensor data, a first signal associated with the beginning of a saved video segment, and a first signal associated with the end of a saved video segment. The method further retains a corresponding first segment of video captured between the first signal associated with the beginning of a saved video segment and first signal associated with the end of a saved video segment. The method then captures, detects and retains a second segment of video in a similar fashion, and combines the first and the second segment into a video montage.

Certain embodiments of a second method for creating a video montage are disclosed. According to the embodiments, the method is comprised of selecting from a client user interface a video segment from a video montage created with the above method, then selecting from a client user interface a second video segment created with the above method, and combining the first and the second segment into a video montage.

BRIEF DESCRIPTION OF THE DRAWINGS

Various embodiments are disclosed in the following detailed description and accompanying drawings.

DETAILED DESCRIPTION

Figure 1:
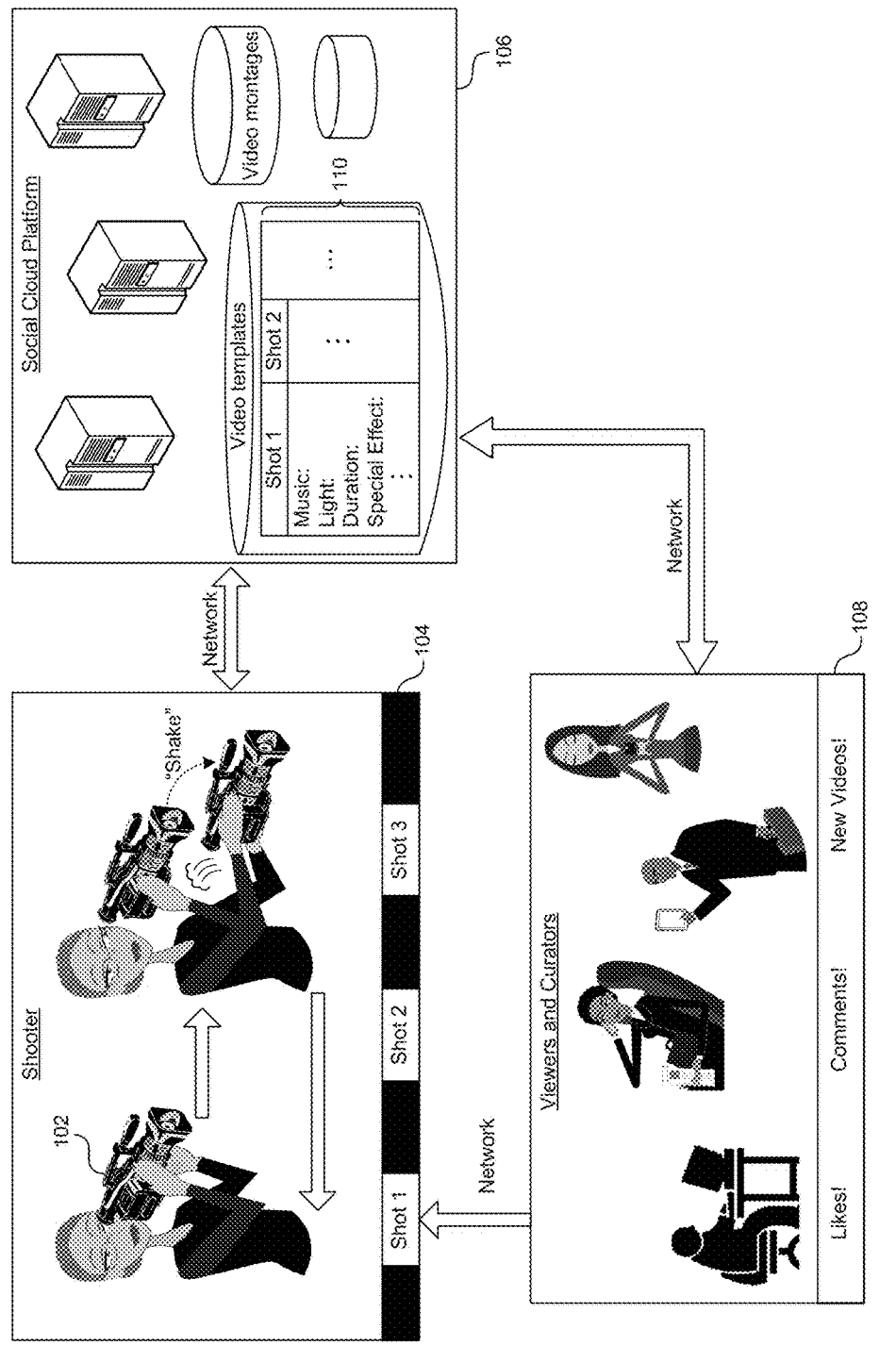
FIG. 1 is an environment diagram illustrating an environment in which a video management system may operate.

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

This application discloses an interactive, real-time video management system, which encourages the creation of high quality video montages composed of high quality video shots. With automated collection of video metadata while recording, the video management system enables new types of interactive video editing and viewing experiences.

The video management system is interactive, instantaneous and transparent to the user. Analyzing the user's movement while recording video can create intuitive interactions involving, but not limited to, the "Shake to Cut" gesture, which would halt the recording as if a movie director had shouted "Cut!" on a movie set. The user's movement may also be detected from a rotate-to-zoom feature which may be available on the camera. The feature is activated when the user holds the camera vertically and deactivated when the user holds the camera vertically. In addition, the continuous interaction between the user and the video management system while recording video, the video montages can be seen as integrating qualitative human judgment relating to meaning, storyline, emotion, etc.

Once video montages have been created, the video editing doesn't need to stop. The collected metadata could be used directly to build a scalable crowd-sourced social video-editing platform. Such a platform can tap into the resources of video curators, who don't necessarily perform the task of video recording. In particular, the platform could make it easy for social video curators to create new video montages by re-using and re-editing any parts of publicly available video montages.

The video management system makes new types of video viewing interactions possible on top of the usual play, pause, fast forward or fast rewind. Indeed, video metadata and in particular the start and end times of shots in a video montage can be used to dynamically add or remove shots, on the fly, without interrupting playback. Among other things, this makes the following interactions possible: "see more of . . . ", or "see less of . . . ", "remix montage", etc.

The streaming of live or near-live video montages also leads to new types of interactions between viewers and recorders. Due to the on-the-fly delimitation of video shots as video is being recorded, viewers can "like" specific action as it is happening. This provides on-the-fly gratification to video recorders regarding specific windows of time in their recordings.

Finally, any video montage created with the video management system could be used as a video template, where the user keeps all the video editing information but replaces the video footage. Video templates could be seamlessly integrated into the rest of the video management system video recording user interface, easily allowing anyone to build upon their preferred video editing templates or video memes.

Overall Environment

FIG. 1 is an environment diagram illustrating an environment in which the video management system may operate. In some embodiments, while a user is recording video using one or multiple electronic devices 102, the video management system may include a component that runs on one or more of those electronic devices 102 or on separate servers and databases. The video management system uses sensor data from the electronic device recording (including but not limited to motion data and how stable the device is) and other available context-dependent data to interpret the user's video editing intent and apply this intent instantly to all the raw video footage being recorded, while simultaneously providing live feedback back to the user (possibly through a network via Bluetooth/Wifi/network/etc.). The live feedback lets the user know if his or her video editing intent is being correctly interpreted by the video management system and/or suggests behavior changes that can improve the quality of recorded video. The feedback is continuously provided to the user during recording, which means the user can instantly react to it, for example to correct a video editing intent that was about to be incorrectly interpreted by the video management system, or to improve his or her video recording behavior. The feedback may, in some cases, operate in a fashion similar to an augmented reality app. For instance, as the user is recording, the video management system outputs a video montage 104 where each shot may be seen as the result of the interaction between the user and the video management system. In particular, the delimitation of each video shot may be seen as the result of the interaction between the user and the video management system.

In some embodiments, the video management system may apply extra video editing effects based on the interaction between the user and the video management system. Such effects include but are not limited to the following: automatically generated location/time/theme based video title or video sub-titles, any type of context relevant cinematographic shot transition between each and every shot (e.g. cut, crossfade, wipe, left-to-right wipe when the frame moved in that direction, or any other type of context dependent transition, etc.), improved shot framing (e.g. by trying to balance a scene with the ⅓-⅔ rule or by making it more symmetric), improved moving-object tracking and framing (e.g. framing a jumping dog, framing figure skaters, etc.), automatic enhancement for low-light shots, smooth shot color transitions based on color histogram analysis, smooth shot transitions based on objects and object movement tracking, smooth sound transitions based on sound/volume analysis of connecting shots, smooth sound transitions based on speech analysis of connecting shots (e.g. if video footage becomes unusable but still contains intelligible speech on the soundtrack, then the transition may shift to the next video shot without interrupting the speech until it ends, and vice-versa if video footage starts out as unusable but does have an intelligible speech soundtrack), color filter video effects possibly specific to each shot (e.g. animated smoky old time black and white, animated scratched sepia, etc.), shot delimitation adjustments based on human or animal expression tracking (e.g. waiting for a running toddler to stop and smile before ending a shot), slow-motion effects on shots (in particular but not limited to action shots with a lot of motion), automatic identification of background music and substitution of this background music with a high quality version, immediately suggesting music to be added to the montage, etc.

In some embodiments, once the user has finished creating a video montage by recording with the video management system, the user can still further edit the video montage and can also record and insert additional footage to the video montage. The video management system can run on the video recording device but this is not necessary as long as a connection (possibly networked, via Bluetooth/Wifi/network/etc.) feeds the relevant data to and from the system (e.g. via JSON with a RESTful API, with WebSockets, etc.) For example, a user might have a video camera attached to her surf board and one attached to one of her wrists; both cameras could transmit data wirelessly via Bluetooth to a pair of smart-glasses running the video management system, which could also project live visual feedback back into the eyes of the person recording. The resulting surf video montage could incorporate footage from both the wrist camera and the surfboard camera. The video management system can also run simultaneously on multiple electronic devices (each possibly connected with a cable or wirelessly via Bluetooth/Wifi/network/etc. to multiple cameras) in order to create a video montage integrating the data and raw footage from all sources.

In some embodiments, in addition to only using the intent of users recording footage, such as a shake gesture, the video management system could take into account the video editing intent, votes or general feedback 108 of users accessing the recorded video montages that have been made available to a social cloud platform 106. The video management system may contain another component that runs on one or more standalone servers connected with one or more databases or on the social cloud platform 106. This component would manage the data created during video shooting, in terms of storage, search, and other functionalities. The video management system may handle the receipt and compilation of the general feedback 108 of users accessing the recorded video montages and the transmission of the general feedback 108 to the author of the recorded video montages, although it is also possible that the general feedback 108 is directly transmitted from an electronic device of a video viewer to an electronic device of a video shooter, which may or may not be the camera used to shoot video.

The video montages stored on the social cloud platform 106 contain metadata and can serve as templates 110 for new video montages. Recorder(s) could select a video template in order to create a video montage with a suggested format or suggested effects (e.g. a Harlem Shake meme video template, see below for a more detailed description of video templates). In this case, the video management system could provide more live interactive feedback to the recorder(s) to facilitate the creation of a video montage following the template guidelines. Finally, the video management system could also process raw video footage after it has been recorded, but the user would then not be able to experience all the possible live interactive feedback features.

System Organization

Figure 2:
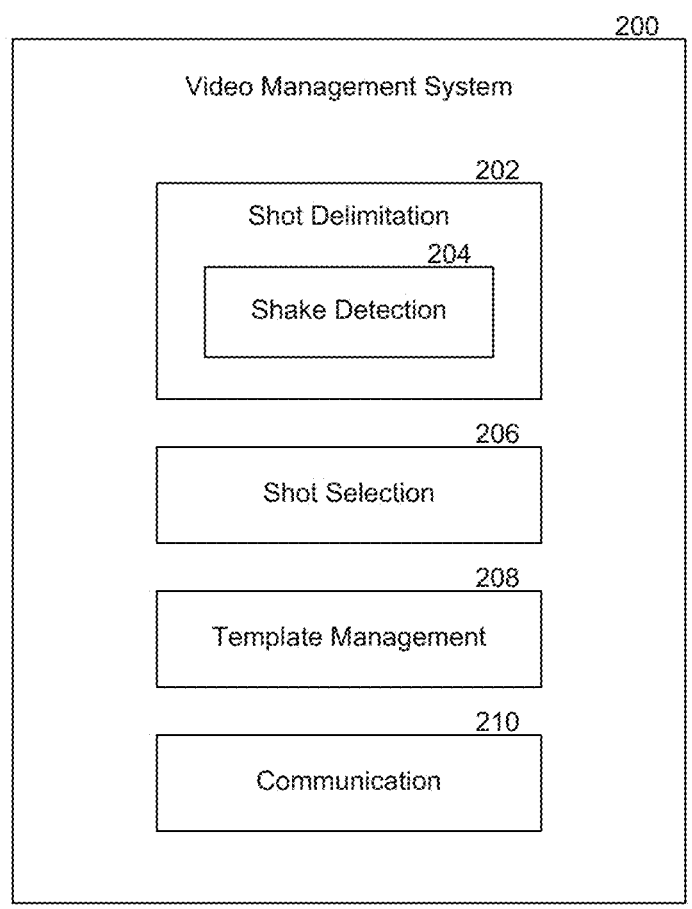
FIG. 2 is a block diagram illustrating example components of the video management system.

FIG. 2 is a block diagram illustrating example components of the video management system. In some embodiments, the video management system 200 comprises a shot delimitation module 202, a shot selection module 206, a template management module 208, and a communication module 210. The shot delimitation module 202 determines shot boundaries. It captures sensor and context-dependent data to form a basis of the determination and further comprises a shake detection module 204 that specifically detects a shake gesture made by a user with an electronic device used to shoot video. The shake gesture is an example of a user's signal to stop shooting. The shot selection module 206 determines whether a shot is to be kept and added to a video montage or to be discarded. As a shot is formed, it assesses the quality of the footage to form a basis of the determination. The template management module 208 handles the creation and use of video templates comprising metadata associated with recorded footage. Specifically, it allows users to access, search, edit, extend and critique video templates. The shot delimitation module 202 and the shot selection module 206 may normally be run on an electronic device operated by video shooters and viewers, while the template management module 208 may normally be run on a social cloud platform or separate databases and servers for storing and managing video montages as well as corresponding video templates. The communication module 210 thus handles the communication between electronic devices and a social cloud platform or separate servers and databases. It makes recorded video montages and templates available in real time to users with access to the social cloud platform. Therefore, the communication module 210 allows authors of the video montages to receive live feedback from viewers of the video montages, and also permits the viewers to obtain references and inspiration from those video montages. The individual components are further discussed in detail below.

Determination of Shot Boundaries

In some embodiments, an output of the interaction between the video management system and users is the shot boundaries of the best moments of video within the raw video recordings. These shot boundaries are useful for many types of video editing procedures. Currently, the process for identifying high-quality shot start and end times inside raw video footage, and then adjusting those start and end times so that shots seamlessly flow one after the other in a video montage, may be one of the most time-consuming tasks of video editing. There are automated ways of generating shot start and end times but these methods lack qualitative human judgment such as meaning or relative importance of moments within a story line. Being able to generate high quality human delimited shot start and end times with the video management system in a way that is effortless to the user is a unique innovation.

In some embodiments, the video management system can (but is not limited to) run by exclusively analyzing the motion sensor data of an electronic device recording video in order to interpret whether the recorder's intent is to: start a video shot, continue recording a video shot, or end a video shot. In general, if recording is constantly on, users tend to keep stable video shots and also discard shaky video shots. This stability-based shot detection makes it possible to use an intuitive "shake to cut/discard" gesture that can easily be detected. Even though shake gestures can be detected using built-in libraries in current electronic devices, for the purposes of using the video management system, it could be important to create a customized shake detector (or more generally, a fast movement detector), as discussed in detail below, that correctly interprets the user's true video editing intent. For example, a small unintentional shake, often mostly translational, should probably not be interpreted as a shake to cut gesture. The same applies to a smooth video pan where the recorder slowly moves the electronic video recording device from one viewpoint to another viewpoint; such movement should probably not be interpreted as a shake to cut gesture. Additional intuitive gestures that may be detected and used for shot delimitation include pointing up the recorder to start shooting and pointing it down to stop shooting. These gestures also include starting to record and continue recording while one's thumb is kept pressed down on the screen of the recorder and stop recording as soon as the thumb is lifted from the screen.

Figure 3:
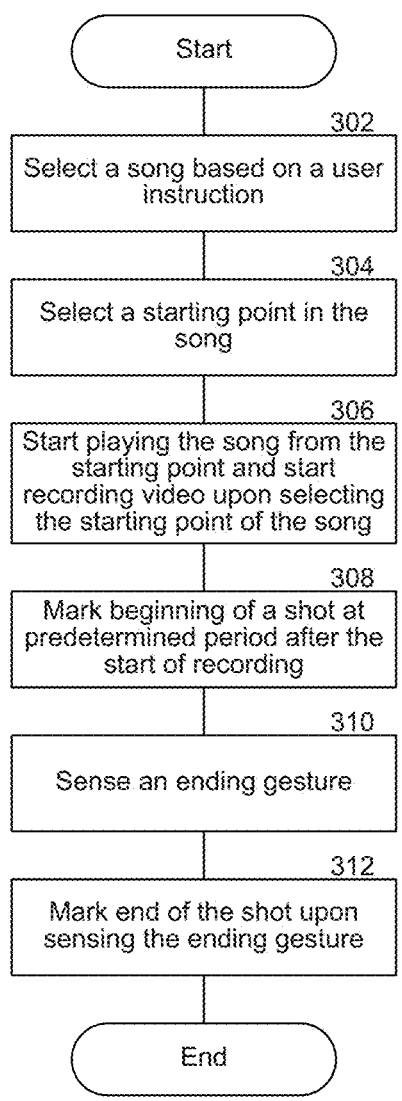
FIG. 3 is a flow diagram illustrating an example process of record a shot with delimited boundaries.

FIG. 3 is a flow diagram illustrating an example process of recording a shot with delimited boundaries. In Step 302, the video management system selects a song or any piece of music to play in the background of a new shot based on a user instruction. The user may manually enter the name of a song, play a segment of the song, and so on to indicate the selection of the song. In step 304, it sets a starting point of the song based on a user instruction. The user may indicate a start time of a song, play the song from the desired start time and so on to specify the starting point in the song. In step 306, the video management system simultaneously starts recording video and playing the song from the starting point. In step 308, after video is recorded for a predetermined period of time, the video management system marks the beginning of a shot. In step 310, the video management system senses a ending gesture made by the user, such as a shake of the video camera. In step 312, it marks the end of the shot upon sensing the ending gesture, thereby ready to add a shot to a montage.

Additional examples of electronic device sensor data and context dependent data that can be used by the video management system are as follows: acceleration, speed, location coordinates, altitude, course, orientation, rotation, magnetic field, temperature, pressure, humidity, a human readable location description possibly including country, state, region, city, locality, ocean, sea, lake, pond, river, mountain range, mountain, mount, valley, identification of emotions or emotional expressions heard or seen in the video (happiness, sadness, surprise, fear, anger, disgust, contempt, hope, disappointment, etc.), windows of time where biological sounds have been detected (e.g. a barking dog), windows of time where human speech has been detected, transcription of speech in the video, languages spoken in the video, unambiguous identification of specific music or songs in the video soundtrack, in particular identification of the precise time windows of music or songs in the video soundtrack (e.g. so that they can be substituted with high quality music recordings), identification of people in the video, user's manually added tags of people in the video, identification of objects such as cars, houses, bikes, roads, paths, glasses, clothes, shoes, gadgets, jewelry, accessories, any object used for sports, or more generally any things or objects of interest in the video, identification of services being rendered or experiences in the video such as a massage, a pedicure, a haircut, some shopping assistance, cooking or food preparation, exercises or classes for fitness, gym, dancing, sports, classes for any academic field, classes for any business field, artistic painting, sculpting, any artistic activity, classes or exercises of any type, cleaning, renovating, painting, home-restoration, childcare, babysitting, mentoring, executive coaching, life coaching, psychological services, health services, health treatments, dental services or treatments, or any other service or experience, identification of the price of any thing, object, service or experience identified in the video, identification of a list of sellers or providers of any thing, object, service or experience identified in the video perhaps with associated prices, identification of general topics or keywords associated with the video, identification of specific actions occurring in the video (e.g. skateboard Ollie, salsa figure, explosion, running, jumping, walking, working out, dancing, playing rugby, playing tennis, playing football, surfing, any type of sport action, cute dog/cat tricks, wild animal action such as hunting, herding, effects of strong weather such as a hurricane winds making trash fly, etc.), nearby population density, live estimation of number of nearby people, nearby utilities infrastructure such as water, electricity, gas, broadband coverage, fiber-optic coverage, gigabit coverage, 3G coverage, 4G coverage, LTE coverage, any future coverage of any future high-speed wireless or non-wireless communication standard, nearby gasoline stations, nearby shops, nearby restaurants, nearby nightclubs, nearby bars, nearby coffee shops, nearby doctors, nearby dentists, nearby drycleaners, any nearby business, nearby landmarks such as buildings, statues, paintings, museums, beaches, natural reserves, parks, nearby wildlife, activities frequently done nearby (e.g. local zip-lining, riding a San Francisco cable car if near San Francisco, etc.), activities frequently done around the same time (e.g. time-local Harlem Shake meme based activities that are not necessarily geographically near), user's manually tagged meme keyword/title for video meant to relate to a specific meme (e.g. "Harlem Shake" meme), local or non-local event specific context data for events happening close in time to when the video is being recorded (such as concerts, protests, strikes, flash-mobs, election speeches, markets, farmer's markets, fairs, etc.), number of people simultaneously recording video (nearby and/or not), number of viewers viewing the live raw video footage via a network, number of viewers viewing the live video montage being created with the video management system via a network, the network connection speed of all video footage recorders and viewers interacting with the video management system or the raw video footage, the number of likes/hearts/votes of viewers on areas of the raw video footage aggregated while recording footage, the number of likes/hearts/votes of viewers on each shot of the video montage being created with the video management system, a ranking of viewers' most suggested video editing effects on each shot of the video montage being created with the video management system, a ranking of viewers' most suggested action items to perform and be recorded next by the footage recorders. Further, in case multiple electronic devices simultaneously collaborate on the production of a video montage with the video management system, the context dependent data for each electronic device includes the live sensor data and context dependent data streamed through a network to and from all the other collaborating devices (including all devices running the video management system algorithm and all devices recording video). Any of the above listed sensor data or context dependent data items can also be added later automatically, or manually by users tagging and describing the shots inside a video montage created with the video management system.

Selection of Shots

Figure 4:
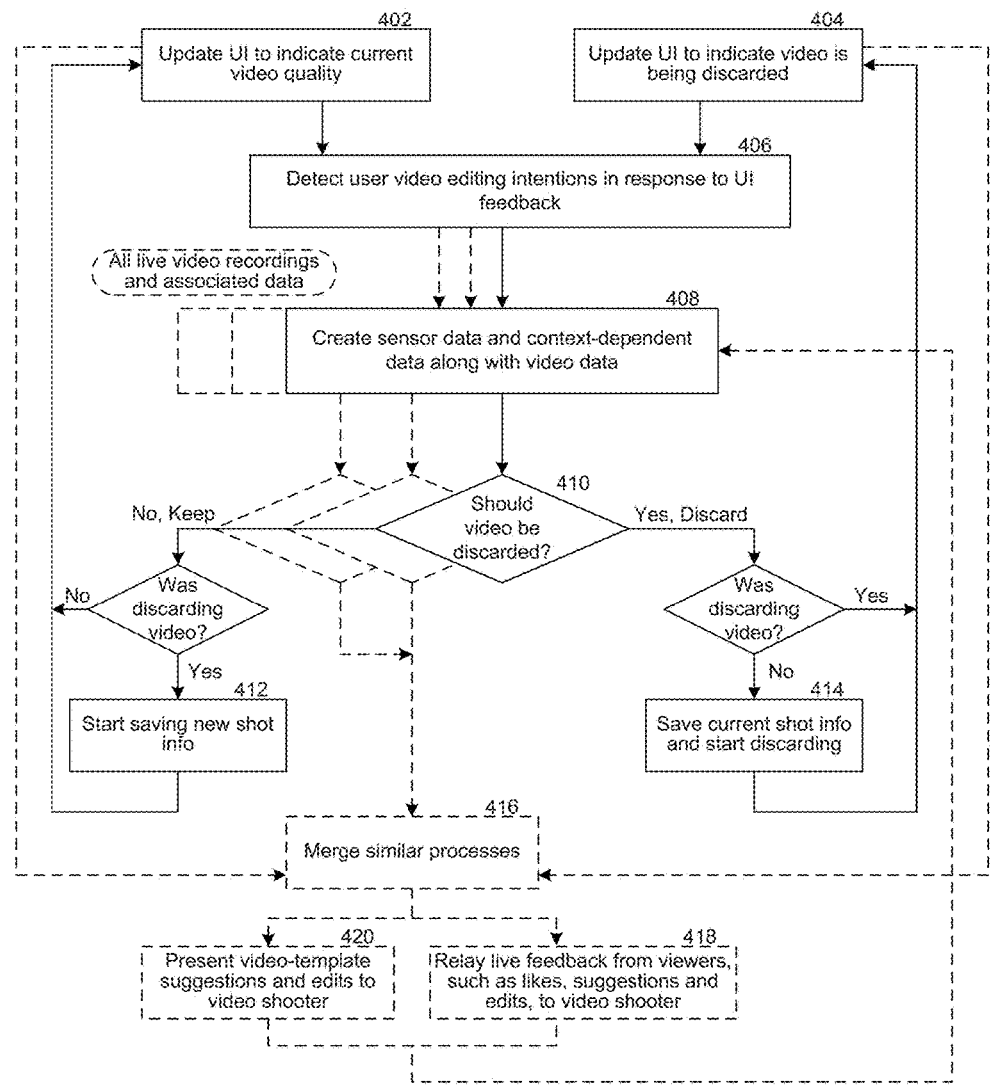
FIG. 4 is a flow diagram illustrating an example process of managing interaction between the video management system and users.

FIG. 4 is a flow diagram illustrating an example process of managing interaction between the video management system and users. Users may record with electronic devices capable of recording video (and possibly also capable of measuring motion) such as but not limited to: a smartphone, a smart-tablet, a smart-watch, a camera, a pair of smart-glasses, or any video recording device connected (with a cable or wirelessly via Bluetooth/Wifi/network/etc.) to an electronic device with some sort of UI (such as a screen, an eye projection device, a sound speaker audible only to the operator, a vibration feedback system, etc.) A video management system is fully interactive in the sense that while recording video, it continuously indicates to the recorders. In Step 402, it indicates if the video footage being recorded is currently being kept as a shot for a montage. It may also give a warning to the user if the video footage being recorded is on the verge of being cut; in which case the moments of video thereafter will be discarded. In Step 404, it indicates if the video footage being recorded is being discarded.

An example user interface that works well for this type of interactive feedback by using an analogy of stage-lights which show a brightly lit color video-preview if the video being recorded is being kept as a shot for later, show a dimmed gray-scale video-preview if the video being recorded is being discarded, and then start fading the video-preview from color to gray-scale to warn the recorder(s) that the video being recorded might soon be cut if his/her/their behavior is not adapted. Furthermore, when the video management system transitions between discarding video and keeping the video for a later montage, the transition from the dimmed gray-scale video-preview to the color video-preview could occur quickly (around 0.1 to 0.3 seconds maximum) to increase the chances that the user notices the change. Switching back and forth from color to gray-scale can be a particularly effective UI because it requires very little cognitive effort from the user to notice it (the human eye has different types of neurons to sense color and to sense gray-scale). This type of interactive interface could provide an unprecedented amount of video editing control while recording.

Additional examples of the types of user interface used to indicate if a video feed is being kept as a shot for a montage, is on the verge of being discarded, or is currently being discarded (i.e. the current state of the video management system) are the following (or any combination of the following): display a white flash (or other color or image such as a green checkmark) on the video preview when a shot is starting to be kept for a montage or when a shot is finished and has been saved, display a quick red flash (or other color or image such as a red delete cross) when a whole shot was discarded (e.g. because it was too short), more generally using any type of continuously updating and animating color filtering of the video feed in the video preview to reflect the current state of the video management system (e.g. the stage lights on/off video preview analogy going from color to gray-scale described above is an example of this), writing the state of the video management system on the UI, showing a customized icon reflecting the current state of the video management system on the UI that may or not be animating, animating a Hollywood clapper on the UI that opens and/or closes every time video is being kept as a shot for a montage or discarded, continuously animate an element when video is being kept as a shot for a montage such as a (smoothly) blinking red light bulb or any button or an icon resembling the image of a red blinking light bulb, rendering a Gaussian out of focus effect on the video-preview when the video is being discarded and transition to a sharp-focused video-preview when the video is being kept as a shot for a montage, animating a closing aperture mechanism when the video is on the verge of being discarded or is being discarded and opening the aperture mechanism completely when the video is being kept as a shot for a montage (or any related animation inspired by the aperture mechanism), animating any type of progress bar (straight or round like a timer) to indicate how steadily the user is recording video or how long they need to remain steady before the video starts being kept as a shot for a montage, displaying a progress bar/circle indicating the current duration of the video montage being created and grow the progress bar/circle only when the video being recorded is being kept as a shot for a montage, in particular add delimitations to the bar every time the user cuts and starts discarding video (this could be very useful for editing purposes later on where the interaction of cutting a whole shot out could be represented by an animation where a delimited section of the bar representing a shot could be flown/moved out of the bar), displaying a small video thumbnail bar and continuously updating and highlighting the region of thumbnails representing shots being kept for a montage (for example by displaying thumbnails of a shot being kept for a montage in bright color while using dimmed gray-scale for discarded thumbnails, or adding a frame around the thumbnails representing a shot being kept for a montage and making the frame resizable and draggable for editing video directly from the video preview), displaying a single thumbnail for each video shot added to a montage (again, this makes future video editing operation of cutting out a shot easier), display the hours/minutes/seconds of the current duration of the video montage being created and update the duration only when the video being recorded is being kept as a shot for a montage, playing a warning sound audible only to the user (or if it is audible to everyone, ensure that it can be removed from the recorded video soundtrack later) if the video is about to be cut and play louder types of sounds if the video started being discarded or started being kept as a shot for a montage, vibrating the electronic device smoothly if the video is about to be cut, and vibrating the electronic device strongly in different ways if the video has just been cut or if it started being kept as a shot for a montage.

In Step 406, it detects user video editing intentions in response to the UI feedback. For example, upon indicating to a recorder that the video footage being recorded is of great quality, the video managements system may soon detect the recorder's shaking the camera to signal an end of recording, when the recorder believes that it is a good point to end a nice shot. In step 408, based on at least the detected user intentions, the video management system creates sensor data and context-dependent data, in addition to the video data. In Step 410, the video management system determines if the video being recorded should currently be kept as a shot or discarded. It may do so in a continuous fashion. When the video was previously being discarded and should now be kept, in Step 412, the video management system marks the beginning of a video shot. When the video was previously being kept and now should be discarded, in Step 414, the video management system marks the end of video shot.

The top dashed copies of Steps 408 and 410 represent the case where more than one video feed is being recorded at the same time by a single recorder or by a group of recorders collaborating. In those cases, in Step 416, the video management system combines the updates from all video feeds into one UI update. For example, the video preview might: switch video feeds depending on which feed is currently providing the highest quality video shot, display the top quality shots from simultaneous feeds, or just indicate the total number of shots currently being kept for a montage. When a group of recorders is collaborating, this live feedback can be a good way of making sure that quality video footage is always being recorded.

Indeed, if all shots from all video feeds were about to be cut, recorders would instantly be informed and hopefully adapt their recording behavior to start new high quality shots. The video management system can also live stream (e.g. through a network) the video montage (or even the live raw footage) to a social cloud platform. In Step 418, it may receive viewers' input on the streamed video such as but not limited to: likes/hearts/votes, live action suggestions, video editing intents or suggestions, etc. (see lower for more live viewer interactions). This outsources some of the decision making of the recorders to the viewers, and can also be done in the case of a single video feed.

Viewers could, for example, be continuously polled on what raw video feed or shot is currently the best, and those votes could be displayed back to the recorders. In particular, polling could act as an instantaneous gratification system that recognizes great moments of video. With live polling of the best shots/feeds in a video montage, a recorder would not have to wait to post a video to receive votes/likes/hearts and feel gratified (and/or perhaps adapt his or her content to get more likes), the feedback loop could be instantaneous. In particular, live shot polling makes the feedback more interesting and precise since it applies to high quality human delimited shots created with the video management system. Additionally, viewers could suggest things to do to the recorders, for example: "More Ollies" to a skater live streaming her skateboard tricks.

Permitted viewers could also add video editing effects to the video montage being created such as tweaking shot start and end delimitations, selecting different shot transitions, adding or modifying background music, etc. Recorders might not be able to see all of these added video-editing effects while they are recording but it could nonetheless increase the quality of the video montage on the fly. When authorized, viewers could add video editing effects synchronously to a single evolving video montage. If large amounts of video editing viewers were present and simultaneous collaboration on the same montage was perhaps not practical, the video montage could be forked and effects could be asynchronously added (c.f. below for more examples of synchronous and asynchronous group collaboration with channels). All these crowd-sourced interactions could be checked against a database of users to possibly add a layer of spam detection.

Finally, the recorder(s) could have selected a video template in order to get help from the video management system to create a video montage with a suggested format or some suggested effects (e.g. a Harlem Shake meme video template, see below for a more detailed description of video templates). In Step 420, the video management system could take into account the video template and update the UI with extra feedback to facilitate the creation of a video montage following the template guidelines.

Additional Shooting and Editing Assistance

Additional examples of the types of feedback the user might be getting while recording video with the video management system include traditional cinematographic recommendations possibly using continuous animation and interactive feedback UIs (such as but not limited to video preview color filters), in particular if the user is zooming in by rotating the electronic device as described below, the video management system may encourage smooth zooming by fading from color to gray-scale; if the zooming is too abrupt, it may discourage users from recording video when lighting is too low by first flashing a warning icon/message and then possibly starting to discard video; if the user is doing a head shot or an over the shoulder shot, it may detect faces using face detection and super impose ideal subject placement sketches on the video preview to encourage better framing, if possible analyze the position of the head(s) and other items in 3D, and recommend the ideal positioning of the recorder in a 3D space to improve framing, e.g. "for a better head shot: take one step back and half a step right". The video management system may also detect conversation or action by detecting people/faces/speech/action and encourage the 180° cinematographic rule by analyzing electronic device motion and overlaying 3D sketches of an 180° wall or line, detect objects, subjects, architecture, surrounding nature and encourage the ⅓-⅔ cinematographic rule or otherwise encourage a symmetric video image composition by overlaying dynamic guidelines on the video feed preview. It may emphasize moving objects inside the video feed preview by surrounding them with fictive UI frames and encourage the recorder to smoothly track their movement by flashing the fictive frames red, fading the video feed preview screen to gray-scale. It may display warnings if the fictive frame moves out of the actual video frame), warn user if background noise is so loud that the video management system will not be able to automatically remove it from the soundtrack, identify subjects talking in the video by surrounding them with fictive frames to inform the recorder that someone talking has been detected (and that they will likely be less interrupted by the video management system in the on-the-fly video editing), identify expressions of emotion in the video with fictive frames (to inform user they will likely be less interrupted by the video management system in the on-the-fly video editing), and display any type collaboration feedback to the UI for teams recording video together. More specifically, when creating the special video effect of freezing time and rotating the camera around the action, the video management system may provide live feedback to inform all video recording group members if they are well positioned and pointing in the best direction so that each one of their video image frames can used to recreate the time freeze rotation of the camera around action or point of interest. The video management system may, if music has been identified as playing in the video feed soundtrack, display a visual indication that this is the case by displaying the title and/or artist of the song and/or a video-preview color filter, display suggestions of content that could be recorded with video (if the user is close to the Eiffel tower, suggest filming it, if there is a video meme that is currently popular, suggest performing it, if the meme is specific to a type of location which happens to be nearby, suggest going there and performing the meme, etc.)

UI feedback mechanisms can be more effective when they quickly stimulate the visual senses. Quick changes (in contrast, color, brightness, etc.) not only require little cognitive effort to notice, but also often attract the attention of users. In some embodiments, the video management system offers quick animations to encourage the fun and rewarding creation of high quality video montages. For example, fading the video preview from color to dim gray-scale, flashing the video preview red/white, animating a Hollywood clapper, and flashing frames around moving objects going off-screen are all fast animation examples engaging users to create higher quality video montages (c.f. above for a more detailed description on these animation examples). Many other possibilities could work equally well or better, including but not limited to animations with more sophisticated design and artwork.

Creation and Use of Video Templates

The video management system could encourage users to record using video templates. In particular, these video templates could potentially be based off of video montages created with the video management system. One example of a video template is a Harlem Shake meme video based off of a Harlem Shake video template featuring a first 15 second video shot of a person dancing alone next to an unfazed group/crowd, a second video shot of the same group/crowd dancing including the person dancing alone on the first shot, and the song "Harlem Shake" by artist "Baauer" as the soundtrack for the whole video montage and starting at same time as the start of the montage. Video templates could work for the creation of any type of video, and could use any song or sound in the background. Meme based videos could have the extra added benefit of having a higher chance of becoming viral themselves, which could help the virality of the product through in-video messaging.

In some embodiments, the video management system maintains metadata associated with the video data being recorded. Such metadata then constitutes a video template that may be reused. Any video montage created with the video management system could then lead to a video template. The metadata could include information such as, but not limited to: typical content descriptions, or typical meme content description in the case of a meme, typical video shots examples, specific or broad recommendations of background music to use (possibly including what specific time windows to use in a song and what video shots to associate those time windows to), in particular a recommendation to mute the original soundtrack and keep only added music as the soundtrack, specific or broad recommendations of video editing or video editing effects, etc. Example video editing effects include but are not limited to: shots of specific length, shot transitions happening at specific times, types of shot transitions, effects added to specific shots of a montage such as animated color filters, slow motion, time freeze rotation of the camera around a point of interest or action (which may require additional video feeds recording the same thing at the same time from different angles), 3D rendered special effects overlaid on the video with video motion detection, or any other specific or broad recommendations of video editing or video editing effects. Video templates could be created and marketed by a professional team or they could be crowd-sourced by users.

For video montages not created with the video management system, the video management system may extract relevant metadata using various existing techniques and creates a corresponding template accordingly. Some of these techniques may also be applied by the video management system during the shooting of a video segment. The music in a video could be identified using fingerprinting technology, such as the ones used in the musiXmatch app and the Shazam app, the Echonest API or the copyright-enforcing ContentID technology provided by YouTube. Today's technology permits accurate detection not only of the song but also of the time window detected inside the song. A cut that marks a video transition can be detected from a compressed encoded video file, instead of a raw footage file where every single video frame image is saved in full, since the start of a new scene generally is encoded with an "I-frame" (also known as a "key-frame") where a whole picture is saved. It could also be detected by tracking the color histogram/average of the each video frame, the motion vectors of objects in the video (i.e. intra-frame motion), and/or the motion vectors of the whole video frame (i.e. inter-frame motion), and marking moments where any (linear) combination of these values changes drastically. Detecting cross-fades where inter-frame transition would be smoother may require tracking values around frame boundaries within a small window of time corresponding to the typical length of a crossfade transition (i.e. from 0.1 second to 1 second). Crossfades could be further confirmed when the video frame images occurring during a crossfade correspond to image combination of 2 short videos blended together with transparency. Other clip transitions such as a wipe or other geometrical transitions could be detected with geometrical pattern matching.

Furthermore, color filters used in video data, such as "sepia" or "black and white" used in some photo and video sharing apps, could be detected by looking at the color histograms/averages and comparing the values with the typical color histograms/averages produced using a given color filter. Often times, a color filter would be used on a whole clip separated by 2 video transitions. Therefore, it may be detected by analyzing the histogram/average values for the duration of the clip rather than just a single video frame, leading to higher accuracy. In addition, naturally occurring color histogram/average values, such as the ones arising from shooting an orange sunset, may be detected and distinguished from artificially-added color filters. Slow motion or fast motion may be detected by analyzing the average movement speed of the objects in a video. This could be done by looking at the motion vectors of objects inside the video (intra-frame motion detection) and the motion vectors of the whole video frame (inter-frame motion detection). Rough estimated of this information be found in a compressed video file. Slow motion or fast motion may also be detected using object tracking, point-tracking, etc. Video titles may be detected with optical character recognition (OCR) software.

Recording a video using a video template with the video management system could be seamless: if a template were selected, extra live feedback items could be added to the video management system video recording UI to help the user record more easily by following template guidelines. Each newly recorded shot could automatically be inserted into the template structure, which would already contain all pre-determined video editing information. There could be different ways of implementing this feature, one example could be to let people reuse all video editing metadata associated with a video montage while replacing all video footage in the montage (or at least replace a high enough proportion of the video footage in the original video montage template to reduce plagiarism). Each new shot recorded could then automatically replace the video shots in the source video montage used as a template, while keeping all the video editing information unchanged.

In some embodiments, when a template specified shot durations, a progress bar could be displayed on the video recording UI to show the current length of a shot being recorded, and how much longer it needs to continue in order to follow the template guidelines (this progress bar could also show the progress of the whole video montage and highlight only the slice representing the progress on the current shot). When a shot reaches the duration specified by a template, animations could be displayed on the UI to encourage the user to stop the current shot, for example with a "shake to cut" gesture. Example animations could be: blinking the progress bar in red, animating an icon of a smartphone shaking, simply stopping the shot automatically and turning the video preview to dimmed gray-scale, etc. In cases where the template suggests discarding the soundtrack of all video shots and instead have only the soundtrack of an added song, each shot could be recorded while playing the specific time window of the song suggested by the template (this could also be done with templates that don't mute the original video sound recording if it is easy to isolate and replace music in the recording while keeping other sounds intact). The video management system may also automatically retrieve the soundtrack of the added song, which may be stored on a social cloud platform, and synchronize the playing of the soundtrack with the shooting of the video as specified by the template. As yet another example, when the template specifies special effects, such as slow motion or fading out, the video management system may automatically apply such special effects to appropriate shots or present reminders to video shooters for doing so. Playing music while recording video could give context to the people being recorded because they could know which part of the video montage is being recorded by inferring it from which part of the song is being played, and they could also move or dance perfectly in rhythm with the music while being recorded. All video montage shots could be stitched together automatically (possibly with more video editing) and be perfectly synchronized with the music. The soundtrack for the video montage could be substituted later with a high quality recording of the song specified by the video template.

In some embodiments, users could vote on templates, and templates could be continuously ranked and suggested to the users of any video management system based product. For example, video templates could be suggested to the user through notifications (by the operating system of the electronic device used, by the browser of the electronic device used, by an app running on the electronic device used, by email, etc.), they could be stored in a section of the video management system based app or website, they could also be suggested when users start the video management system video recording interface, etc. There could also be shot specific suggestions displayed just before recording a specific shot of a template.

Figure 5:
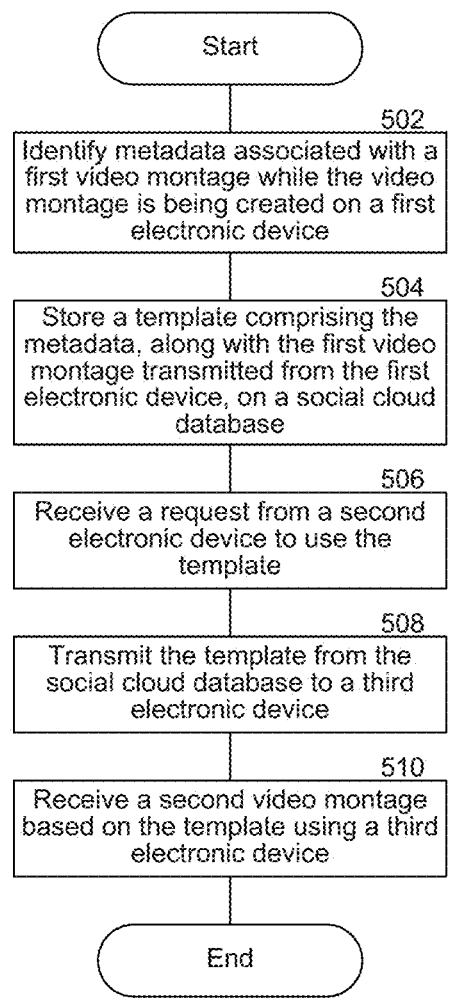
FIG. 5 is a flow diagram illustrating an example process of creating a video montage using a video template.

FIG. 5 is a flow diagram illustrating an example process of creating a video montage using a video template. In Step 502, as a first shooter creates a first video montage using a first electronic device, such as a video camera or a cellular phone with a built-in camera, the video management system identifies metadata associated the video being created as discussed above. In step 504, it transmits a video template comprising the metadata along with the footage to be included in the first video montage to a social cloud platform for storage, allowing these items to be accessed by other users. In Step 506, when a second shooter intends to create a second video montage, it receives a request to use the template from the second electronic device, which may or may not be the same as a third electronic device used to create the second video montage. For example, the second electronic device could be a laptop, while the third electronic device may be a video camera. In Step 508, the video management system transmits the template from the social cloud platform to the third electronic device directly or through the second electronic device. In step 510, the video management system manages the creation of the second video montage using the second electronic device according to the template.

Additional Features

In some embodiments, the video management system outputs the time and location of the start and end of each shot. Generally, electronic devices used for recording video tend to account for current time and location while recording footage (e.g. via GPS, WIFI location databases, cell-tower location databases, etc.). Shots can then instantly be analyzed to visualize how and when the video montage was created. For example, the video management system could generate a map or globe in real time that displays an evolving trajectory corresponding to the sequence of shot locations in a video-montage. Another example is automatically generated subtitles for the time and location of each sequence of shots in a video montage recorded near the same place, for example, a sequence of shots could have the following subtitle: "Menlo Park, Calif. USA—6 pm March 21st 2013". Similarly, an automatically generated title for the whole video-montage showing the time range and location range for all the shots could also be used, for example: "California, Nevada USA—March 21st to 25th 2013".

In some embodiments, the video management system may also create high quality video thumbnails. Since it knows the start time of each video shot in a montage, it is no longer limited to showing a single static picture to represent a whole video montage. Indeed, without any further work from the user since recording video, it is now possible to use a highly relevant dynamic video thumbnail successively showing the start image frame (or any other frame) of each video montage shot. This approach also benefits from the fact that human beings have delimited the video management system video montage shots, and the resulting thumbnails could therefore be of higher quality than if they were entirely machine generated.

Additional examples of the type of outputs coming from the interaction between the video management system and the users are the following (or any combinations of the following): analyze the environment sound of video to detect voices in order to reduce the chances of interrupting people who are talking (for example with an involuntary shake to cut gesture), make the shake to cut algorithm more tolerant to shakes when voices are detected, combine voice detection with face or people detection to increase the probability that a detected voice is the voice of someone in the image of the video (rather than a loud out-of-frame bystander), analyze sound and image independently in order to keep the best possible video soundtrack moments independently of keeping the best possible video image-track moments, keep the sound recording where the least disagreeable noise is present or even decompose the soundtrack into an interesting sound soundtrack versus a disagreeable noise soundtrack algorithmically in order keep only the interesting sound soundtrack, analyze lighting conditions and detect recorded moments video that are too dark to see anything in order to remove them, use low light detection in conjunction with the customized shake to cut algorithm to keep shots that are both stable and luminous enough, enhance low-light video shots algorithmically for shots that are dark but still salvageable and contain enough information to be enhanced into useful video, use a color detector on the video being recorded to identify moments where close objects obstruct the electronic device's video recording lens (such as a finger, a scarf, clothes, hair, etc.) in order to cut those moments out, use voice commands to start and stop recording, simultaneously analyze the quality of multiple video feeds from other electronic devices (that are using or not using video management systems) in order to keep only the best shots, independently analyze video soundtracks and video image-tracks when multiple electronic devices using video management systems are recording the same event in order to keep the best video soundtrack and the best video image-track from potentially different sources and combine them into a high quality video montage, create the special video effect of freezing time and rotating the camera around the action simply by using the video frames of different electronic video recording devices pointing at the same thing at the same time, enhance the framing of video shots algorithmically so that they follow the traditional norms of cinematography (e.g. recognize people, objects, architecture, natural elements and frame video around them, try incorporating the ⅓-⅔ rule around these elements, smooth the movement of a frame tracking a moving object, etc.), detect the emotions of people recorded (laughing, crying, surprise, fear, joy, anger, or more generally any arousing emotion) and favor the selection of moments of video expressing those emotions, analyze the emotion of the person recording video (c.f. last point for a list) while he or she is recording in order to favor the shots where the recorder expresses strong emotion (this could be done by analyzing the sound track of the video or by simultaneously recording video with the front facing camera of the electronic device if it has one, if the user is recording with a pair of glasses and there is no front facing camera, it could be possible to record and analyze the eyes of person wearing the glasses and measure, for example, pupil dilation as an indicator of arousal), save the likes/hearts/votes of users who viewed the video (live or later) in order to rank the best shots of each video montage and automatically filter out the lowest ranked shots, saving raw electronic device sensor and context dependent data for later (c.f. above for examples) so that the video management system and video montages can be improved with machine learning methods later on, in particular use the likes/hearts/votes as a metric to optimize when training the machine learning algorithm that improves the quality of the output of the video management system.

Shake Detection

Figure 6:
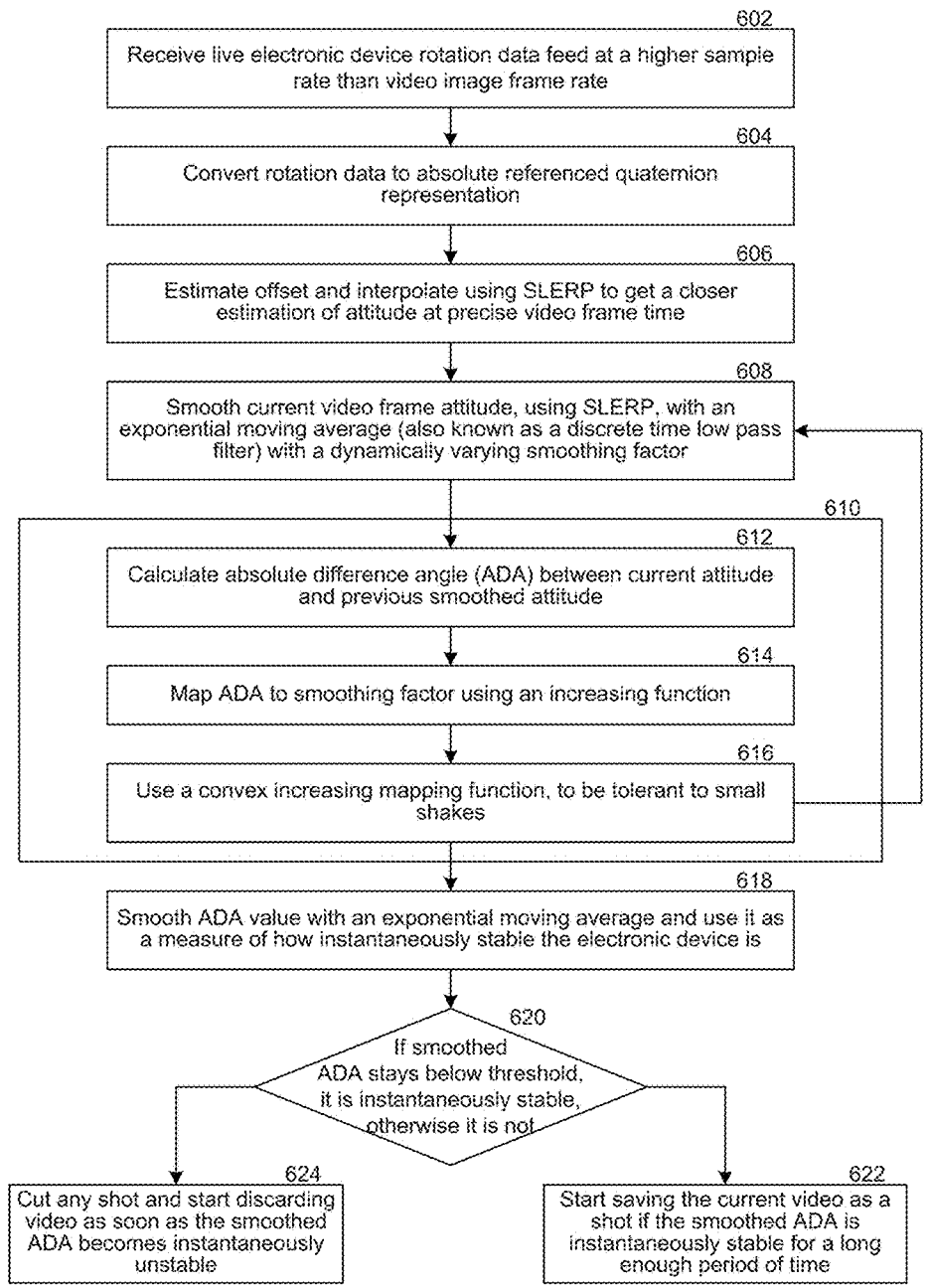
FIG. 6 is a flow diagram illustrating an example process of detecting a shake gesture.

FIG. 6 is a flow diagram illustrating an example process of detecting a shake gesture. In Step 602, the video management system receives electronic device rotation data (also known as attitude or orientation data, generally including values for three axes of rotation: pitch, roll and yaw) at a sample rate greater than or equal to the video frame rate (generally at least 24 to 30 video frames per second on today's electronic video recording devices). In Step 604, it converts each sample rotation to an absolute referenced quaternion representation to facilitate later computations and improve numerical precision. In Step 606, since it can be the case that sample attitude timestamps and video frame timestamps are not the same, the video management system estimates the attitude at the precise time of each video frame using the known Spherical Linear interpolation (SLERP) procedure. It is sometimes also necessary to estimate the offset time between video frame timestamps and motion data timestamps because they may originate from different hardware clocks. Once that is done, it can help to smooth the raw rotation attitudes because they can be jittery, rendering their interpretation difficult if not impossible.

Different types of smoothing algorithms relying on SLERP can be implemented. A quaternion-valued moving average over a sliding window of time can work but the resultant values can still be too jittery. A quaternion-valued exponential moving average (exponential moving averages are also known as discrete low pass filters) may be smoother, but in order for it not to react too strongly to small involuntary shakes, a low smoothing parameter may have to be used, and this frequently causes the smoothed average to lag too far behind the current attitude value. Therefore, in Step 608, the video management system uses a quaternion-valued exponential moving average with a dynamically varying smoothing factor as a smoothing algorithm. In Step 610, the video management system computes the smoothing parameter for each sample attitude. In Step 612, the absolute difference angle (ADA, used herein) between the current attitude and the previous smoothed attitude is computed (the very first smoothed attitude is set to the identity quaternion). In Step 614, the ADA is mapped to the smoothing parameter value using an increasing function. This means that the higher the value of the ADA, the higher the smoothing parameter value will be and hence also the closer the new exponentially smoothed attitude will be to the current attitude. This particular mechanism prevents the smoothed attitude from lagging too far behind the current attitude. In Step 616, to avoid triggering large smoothed attitude changes because of small unintentional shakes, a convex increasing function is used to map the ADA to the smoothing parameter. This could keep the smoothed attitudes stable for small ranged ADAs values but quickly adapt the smoothed attitudes for large ranged ADA values (e.g. resulting from consequential and voluntary user movements). The ADA value can then be used to get a measure of stability. However, since the ADA is the difference between a smoothed attitude and the current jittery attitude, it is itself jittery and it could help to smooth it.

In Step 618, the video management system smoothes the ADA value using an exponential moving average with a constant smoothing factor. The resultant smoothed ADA values work well as an instantaneous measure of device stability. In Step 620, the video management system determines whether true (non-instantaneous) stability has been established; true stability occurs when the smoothed ADA values stay below a predetermined threshold for a long enough period of time. Indeed, even though the device may be instantaneously stable, many users prefer knowing that it is only considered truly stable if it is instantaneously stable for a predetermined amount of time (among other things, this discards unintentional shots that are too short, and adds predictability to the shake detector). Conversely, a true shake could be identified only if the shake (or instantaneous instability) lasts for a long enough period of time. The exact start time of a true shake could be identified by using the exact moment when the device becomes instantaneously instable. In Step 622, if the smoothed ADA value is instantaneously stable for a predetermined period of time, the video management system starts saving the current video as a shot. In Step 624, as soon as the smoothed ADA becomes instantaneously unstable, the electronic device can immediately be considered truly unstable and the video management system could use this information to cut the current shot and start discarding video (although other features may also be taken into account for this operation such as: people still talking, someone starting to smile, the tracking of a moving object being recorded by the user, etc. see above for more examples of how shot start and end times could be influenced). Additionally, it may be possible to fine tune the shake detector by starting every shot a few tenths of a second before/after the electronic device becomes truly stable and then cutting every shot a few tenths of a second before/after it becomes truly unstable. This can be useful in cases where the detector might take a little too long to detect a shake and all shots may look better if they are all conservatively trimmed.

The smoothed ADA values computed in Step 620 can also be used to provide feedback on how truly stable the electronic device is while recording a shot. If the ADA values are much higher than the threshold value, then live feedback could be given to the user to indicate that the device is completely truly stable (such as but not limited to a UI on the electronic device displaying a preview of the video feed in full bright color). If the ADA values get closer to the threshold, which might cause the recorder to trigger a shake-to-cut gesture, then live feedback could be given to indicate this state (such as but not limited to a UI on the electronic device displaying the video feed in gray-scale, in particular, the ADA values could be mapped directly to a parameter controlling the amount of color in the video preview; a dimmed gray-scale video preview could be kept for when shots have actually been cut and video is being discarded).

In some embodiments, the smoothed attitude used for the customized shake detector described above could also be implemented as the smoothed attitude used to stabilize the video images. In other words, when stabilizing the video being recorded (as is often automatically done on electronic video recording devices today), the raw video image 3D rotation motion could be corrected in such a way that the stabilized video image has the same smoothed motion as the smoothed attitude motion used for the customized shake detector described above. This would reinforce the recorder's feeling that his or her video editing intent is correctly understood by: automatically smoothing out involuntary shakes in the video, better accompanying a recorder's smooth video pans, starting to move the video frame only when the electronic device is considered instantaneously unstable (as defined above) and the shot is about to be cut, etc. However, even though this type of stabilization could be ideal for the final recorded video footage, it might not always work well for a live video preview seen by the recorder. Indeed, for devices such as smart-glasses that could project the live video feed into the eyes of the recorder, stabilizing the live video feed might cause cognitive dissonance between the motion the recorder sees in the video preview and the motion the recorder feels in his or her environment. In cases like this, it could be better not to stabilize the video feed preview, even though the final recorded video could still be stabilized in the background as described above. This cognitive dissonance between the preview and the environment should not be a problem for other types of electronic devices.

In some embodiments, the customized shake detector could also be run on a video after it has been recorded. For example, motion data measurements could be saved in the video file containing the video image track and the soundtrack as a third "motion data" track. When reading the video file, the shake detection algorithm could process the values from the motion track just as if it were operating in real-time (this third motion track could also have the added value of being used to improve inter-frame image prediction thanks to possibly more precise 3D motion values and could potentially improve the compressibility of video). If motion data were not available at all, it could be possible to estimate it from the video footage images. For example, it could be possible to run an optical flow algorithm on the video footage and estimate 2D/3D whole frame motion (while possibly also minimizing the influence of intra-frame motion). It could also be possible to estimate whole frame motion values directly from pre-computed data inside compressed video files that use a codec taking advantage of motion estimation (for example, H.264 AVC uses block-oriented motion compensation). These estimated whole frame motion values could then be used as an input to the shake detector described above, which may need to be calibrated specifically for use (in particular, values of whole frame motion estimated from the video's images might be different from raw gyroscope and accelerometer values).

Example Scenarios

Figure 7A:
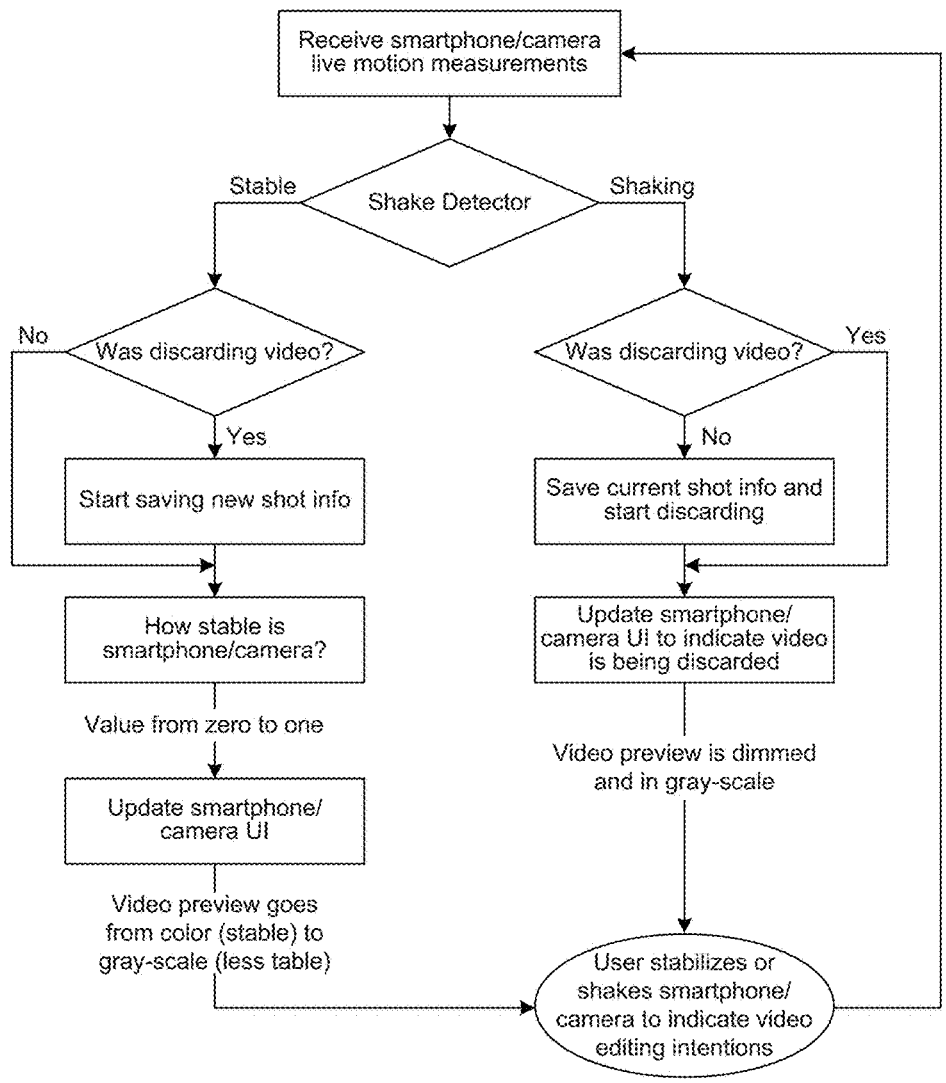
FIG. 7A is a flow diagram illustrating an example process of interacting with an electronic device involving a user gesture.

FIG. 7A is a flow diagram illustrating an example process of interacting with an electronic device, such as a smartphone, involving a user gesture, such as a shake to cut video editing gesture. This process largely mirrors the process illustrated in FIG. 4. It could work equally well with a smart-watch that has a screen and is capable of recording video and measuring motion, or any type of video recording camera with motion sensors and a screen. In this example, the video management system uses the electronic device's motion data to automatically determine when to keep or discard moments of video. It could also use more context dependent data or sensor data from the electronic device for which examples have been provided above. Further, the user is informed if the video recorded is being kept as a shot for a montage, being discarded or is on the verge of being discarded by respectively displaying a color, dimmed gray-scale, or gray-scale video feed preview on the screen of the electronic device. Additional UI feedback methods described above could also be used to provide more information and interactivity to users.

In some embodiments, zooming interaction can be used to analyze the orientation in which the video recorder is holding the electronic device: holding the electronic device vertically activates zoom, while holding it horizontally deactivates it, all while continuing to record video with a horizontal 16:9 image aspect ratio (or some other traditional width:height horizontal image aspect ratio). This works with smartphones/cameras/watches capable of recording video and discerning orientation. It is useful to use this interaction with horizontal 16:9 ratio videos because most electronic device image sensors are aligned in such a way that the longest side of the sensor is parallel to the longest side of the device. This means that without any zoom, it is only possible to record in horizontal 16:9 image aspect ratio if the electronic device is being held horizontally. But by zooming in sufficiently while holding the device vertically, it is possible to use a horizontal 16:9 slice of the vertically positioned image sensor and continue to provide a horizontal 16:9 (zoomed in) video. Furthermore, it could be easy to control the zooming effect continuously by analyzing the smoothed angle with which the electronic device is being held: i.e. slowly turning the device from horizontal to vertical would progressively zoom in more and more until a fully vertical position has been reached. This rotation-based interface could provide an unprecedented amount of control on the amount of zooming while recording video, and in particular while recording video with one hand only. When providing a video feed preview, this zoom interaction works well when it is complemented with a video preview that brightens the zoomed region of video being recorded and dims the region of video being discarded, possibly also making it gray-scale. Since the device angle is used to zoom into an angled region of the sensor/preview, the highlighted region being recorded could always appear horizontal to the user regardless of the angle with which the user is holding the device. The device orientation or angle could potentially also be used in a similar way for many other types of interaction such as starting or stopping the recording of raw video footage, etc.

A useful variation when using a smart-watch capable of recording video and measuring motion is the following: if the user covers the watch, it could automatically start discarding video or even completely stop recording video. Simple actions such as sliding one's sleeve over the watch or covering it with a hand could trigger the video management system to discard video. This interaction could make editing and recording video with the video management system easier when using a smart-watch.

Figure 7B:
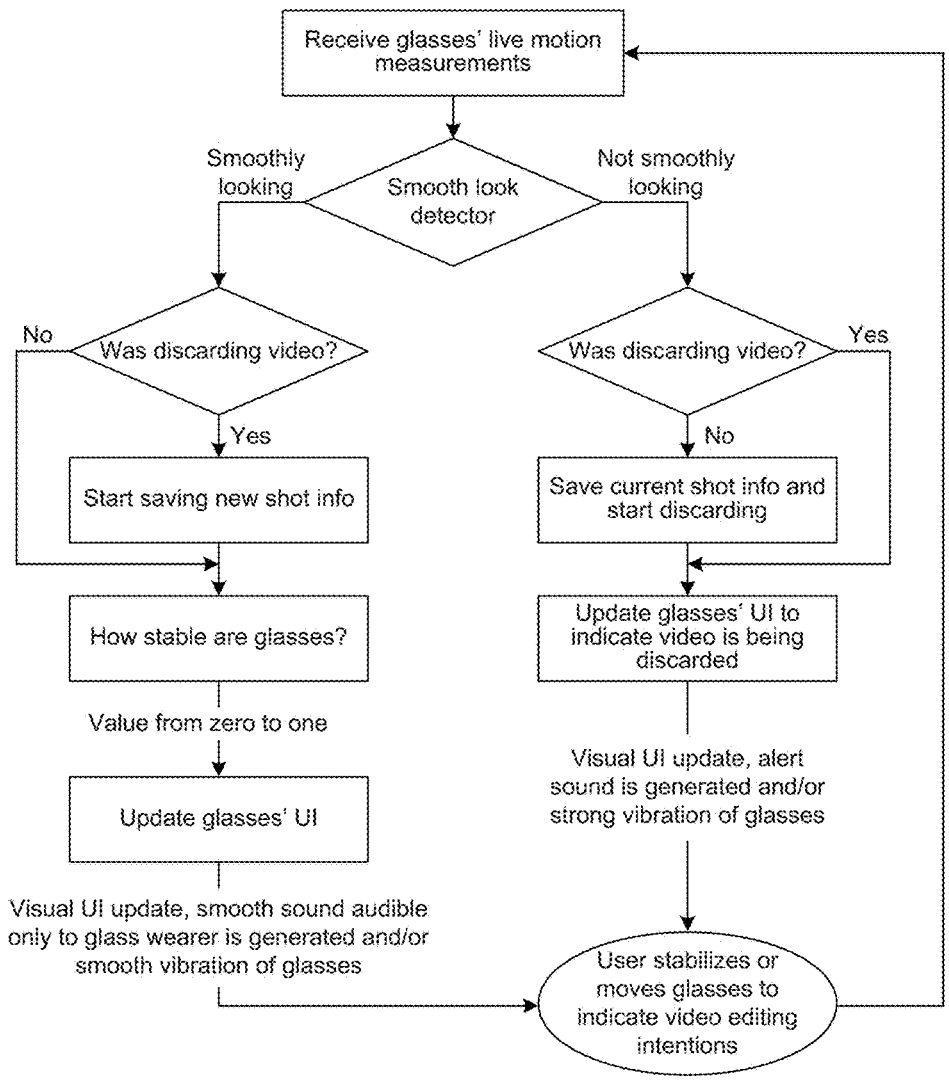
FIG. 7B is a flow diagram illustrating another example process of interacting with an electronic device involving a user gesture.

FIG. 7B is a flow diagram illustrating another example process of interacting with an electronic device involving a user gesture. This process also largely mirrors the process illustrated in FIG. 4. This example involves a pair of video-recording capable smart-glasses with a motion sensor and some combination of visual/auditory/vibration UI, where the gesture to keep a video for a montage is to steadily look at a specific point. In this example, the video management system uses the glasses' motion data to automatically determine when to keep or discard moments of video. It could also use more context dependent data or sensor data from the glasses or data from other connected video recording devices for which examples have been provided above. Furthermore, the user is informed if the video recorded is being kept as a shot for a montage, being discarded or on the verge of being discarded by any combination of the following feedback mechanisms: a visual UI update projected into one or both eyes (like the color versus gray-scale video feed preview described above, or a white flash when a shot starts being saved), a warning sound audible only to the wearer of the glasses (or if it is audible to everyone, ensuring it can be removed from the recorded video soundtrack) if the video is about to be cut, and different types of sounds if the video started being discarded or started being kept as a shot for a montage, a smooth vibration if the video is about to be cut, or stronger types of vibrations if the video has just been cut or started being kept as a shot for a montage. Additional UI feedback methods described above could also be used to provide more information and interactivity to users. If the glasses did not have enough processing power to run the video management system, it could simply transmit the recorded video and sensor data to a powerful enough smart-phone that the user could also be carrying (with a cable or wirelessly via Bluetooth/Wifi/network/etc.)

In some embodiments, the video management system facilitates certain viewing interactions using the start time of each shot in a video-montage. For example, without any further work from any user since recording, it is possible to offer the "skip to the next shot" or "skip to previous shot" interactions. Since shots made with the video management system generally have high quality with human-created delimitations of the video, these skip to next/previous shot interactions could be a more efficient way to navigate the video compared to the traditional fast forward, fast reverse, or using a video slider. The skip to next/previous shot interactions could be implemented with buttons (on screen, physical, etc.) or with right/left swipe actions. For devices for which these implementations are not practical, it could be possible to use motion gestures. For example, a user wearing a pair of glasses with motion sensors could turn the head right to skip to the next shot, or turn the head left to skip to the previous shot. Similar hand based gestures such as waving the device right or left could also be used.

More generally, the video management system may facilitate many video editing operations using both the start and end time of each shot in a video montage by: cutting a whole shot, applying a slow-motion effect to a shot, applying a color filter to a shot, synchronizing a shot transition with a specific time in a song or voice commentary, reordering shots or chunks of shots in a video montage, etc. These operations could normally be time-consuming because they could require that a user manually specify the start and end time of each shot that they wanted to modify at some point after recording the video and before editing the video.

Figure 8:
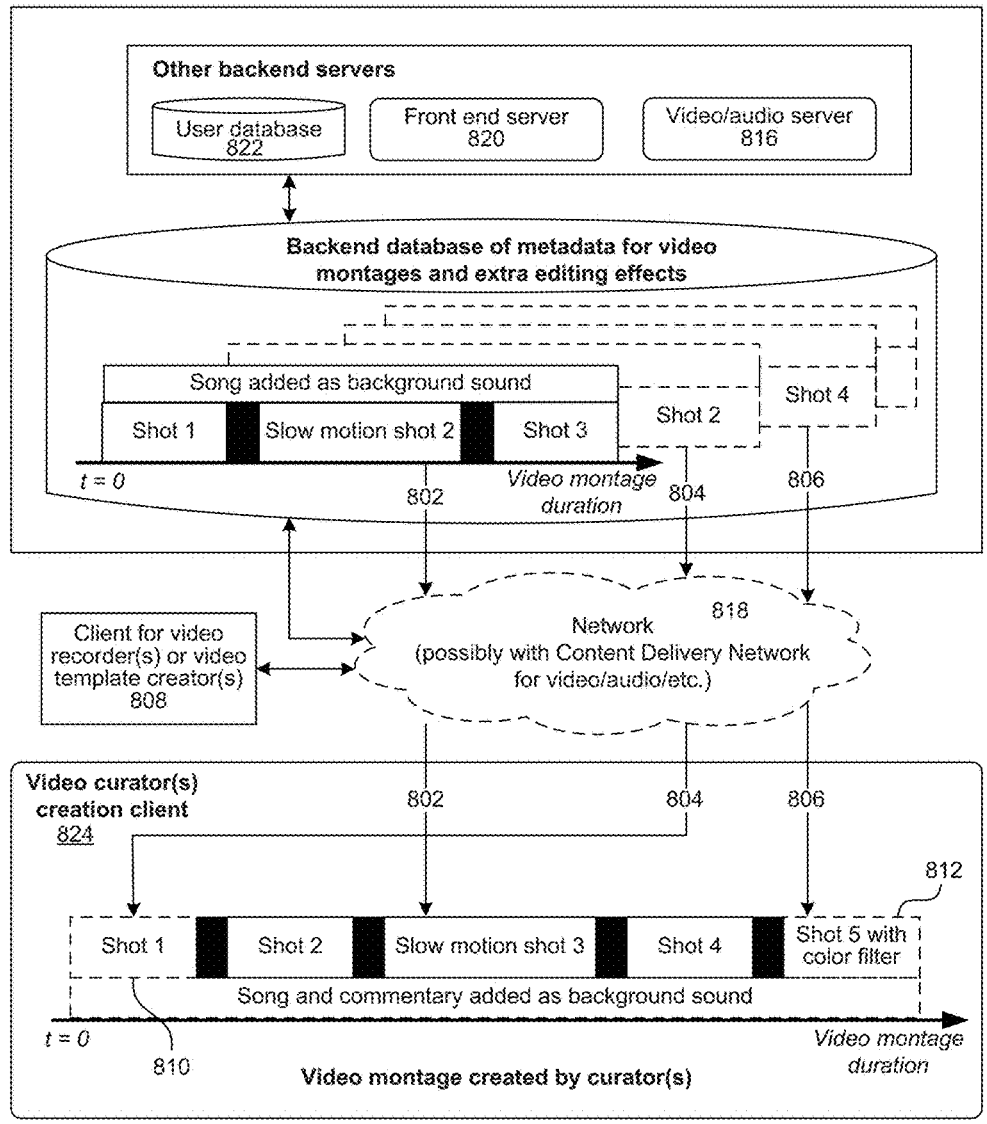
FIG. 8 is a flow diagram illustrating an example process of creating new video content using video templates.

FIG. 8 is a flow diagram illustrating an example process of creating new video content using video templates. The video metadata (including but not limited to shot start and end time) could be valuable to "social video curators" who want to create video content. In particular, curators might not necessarily want to record video themselves, and might prefer only re-using existing video content. For example, a typical video curator could generate a new video with a client interface on an electronic device 824 such as but not limited to: a desktop browser, a laptop browser, a smartphone browser, a tablet browser, a smart-glass browser, a smart-phone browser, a smart-television browser, or a browser on any other type of electronic device, a desktop app, a laptop app, a smartphone app, a tablet app, a smartglass app, a smart-phone app, a smart-television app, or an app on any other type of electronic device, or any other type of user client operating on any type of electronic device.

The process could start by selecting a few video montages 802, 804 and 806 or selecting shots inside video montages created by anyone using the video management system 808 and stored on the social cloud platform 814, reordering shots or chunks of shots, as shown by the flow of 802, 804 and 806, cutting out irrelevant shots, adding a voice commentary or a personal choice of music to the entire video montage 810, customizing shot transitions, adding or modifying titles or subtitles, adding video color filters to one of the shots 812, etc. In particular, the chunks of shots just mentioned could be another user's video montage creation, along with all the editing information attached to it such as voice commentary, background music, customized transitions, color filters, titles, etc. The video montages selected by the social video curator for his or her new video montage could have been recorded at the same place or time, or could have been recorded at completely different places and times. Further, the curator could be using video templates to create this new montage, and this template could possibly have been crowd-sourced by users 808.

As described above in more detail, any video montage could be used as a video template. In some embodiments, the video curator could keep all the video editing information of a montage but replace all the video shots with other video shots made publicly available. As a result, the time-consuming process of selecting the start and end times of each shot and then stitching those shots together could be done automatically and instantly. On the social cloud platform 814, the backend databases store all metadata for all video montages and extra editing effects created by users using video management system compatible products. The video management system may comprise a video footage server 816 that works with these databases to serve video montages and templates through a Content Delivery Network (CDN) 818. The video management system may further include a user database 822, which it may use to filter out spammers or spam activity (such as but not limited to ignoring all interactions from new members or from members who haven't interacted much).

In some embodiments, the video management system may also use any type of logic on database data, perhaps add some logic to check that a new video montage is not too similar to any existing video montage (so users don't feel plagiarized), or any other type of logic, computation operation, storing operation, streaming operation, interaction with the CDN to minimize streaming costs, decrease latency, and increase throughput, etc. The UI on electronic devices displaying video montages created by social video curators (such as video players, websites pages, app views, etc.) could list all due credits to original or collaborating creators and contributors. With proper server capacity planning and network connectivity, these social video curator creation interactions could make possible the constant asynchronous collaboration on video content by millions of users.

In some embodiments, the video management system may enable the creation of video summaries or video trailers. When creating a video montage, a social video curator could use shots that summarize the source video montage from which they have been selected. The new video montage could be considered a summary of all the video montages from which the selected shots come. Additional UI elements could be added to allow access to the original source video montages while playing the video summary on an electronic device client. In particular, there could be a "see more of . . . " button on the client UI, which could insert video shots from source video montages into the video summary montage without interrupting playback. Additional effects such as smooth video/sound cross-fading could also be added on the fly to make sure the transition to the inserted shots appeared natural and unobtrusive (possibly also using any or all other automated video editing effects mentioned above). This is only an example implementation of the "see more of . . . " interaction; there could be many other ways of implementing it with all the information available in the video montage metadata database and all other collected data. A "see less of . . . " interaction could be implemented similarly to the above for any video montage; when a user felt like they wanted to skip over the next few similar shots, the "see less of . . . " interaction could automatically remove all shots that come from the same source video montage. This is an example implementation of the "see less of . . . " interaction; there could be many other ways of implementing it with all the information available in the video montage metadata database and all other collected data.

Promotion of Completed Videos

In some embodiments, the video management system may manage a voting mechanism for video montages created with the video management system. Example names for voting interaction include but are not limited to: like, heart, vote, contest participation, poll, survey, emoticons, emoji, any associated icon or design reflecting these concepts, etc. Every vote could be checked against a database of users in order to identify the source of votes and potentially add spam prevention mechanisms. A voting mechanism could increase virality because users could get gratification from others' reactions to their video montages, which in turn would encourage them to create more video montages. This could in turn spread the product to more users since each video montage could have product messaging in it. Users could also be asked to vote on videos that best answer a question or inspiring prompt. Questions or prompts could go from simple written suggestions all the way to full-fledged video montages pitching elaborate ideas and actions to potential video recorders (such as video templates, memes, etc.)

In some embodiments, the video management system may add a voting functionality on individual shots of a video montage created with the video management system. This could benefit users because shots created with the video management system could be more meaningful and topic specific since they could be considered human delimited. In particular, votes on specific shots of a video montage could give more relevant feedback on specific action recorded during a shot. Since video montage shots are shorter than whole video montages, shots could also be voted on more frequently, which could help increase the virality of a video management system based product. Voting mechanisms could also be added on all video editing choices of a video montage such as, but not limited to: letting users vote on the best publicly available shots to insert into a video montage (and possibly also letting users suggest shots in the first place), letting users vote on the best shot transitions, letting users vote on the song that should be added to the video montage soundtrack (and possibly letting users suggest songs in the first place), letting users tweak the start and end time of each shot and letting them vote on the different possibilities, letting users vote on the best animated color filters, etc. (more examples of video editing operations in the discussion above, each of which could be voted on). Each top voted video editing operation could be integrated into the video montage (either instantly in the case of open-editable video montages, or otherwise after getting the approval of the video montage's owner). This could be a way to make it easy for millions of people to collaborate on the editing of a video montage.

In some embodiments, the video management system allows voting to be conducted live, while video shots are being recorded, such that votes would be sent back live to the user recording. Votes on shots and video montages could also be used to curate content in a more efficient way. For example, the best video montages could be ranked by number of votes and displayed in a "most popular" section of a website or app. Other ranking parameters could be used in conjunction to votes such as: time weight decay to make sure that top ranking videos/shots/etc. always stay fresh and new, a people-rank algorithm to weigh the votes of each user differently depending on their popularity (like PageRank, but based on a directional follower network of video viewers, curators, or creators, c.f. below for the example of channel following directional network). Additionally, users could be encouraged to classify video montages or video shots into specific buckets or categories such as but not limited to: sports, travel, home decoration, etc. This could make it possible to have bucket specific lists of popular videos, or bucket specific feeds of video montages, which could be more interesting to groups of users with specific interests. The number of buckets could also be limited to increase the chances that users add content to the same buckets, and hence decrease the chances of having empty or almost empty buckets.

In some embodiments, the video management system may allow users to create video channels to help them better order and navigate existing videos. A channel, as defined herein, could be saved on cloud servers and could be created by any user and have any title. It could belong to a specific bucket or category, as described above. A channel could contain a list of: video montages recorded by the user, video templates created by the user, video montages created by the user as a curator, video montages that are mixes of shots recorded by the user and shots selected by the user as a social curator, or video montages created with video templates in any way. A channel could also contain video montage re-posts that other users already posted to their channels. All video montages in a channel could list all due credits to creators and contributors of the content in the montage. Any shots in a video montage could be considered to belong to the same channel as the video montage itself, and be in the same bucket/category as the channel of the video montage. Any user could follow a channel if the channel were public. A user following a specific channel could be represented by an edge in a directional graph going from users to users' channels (or a graph from users to users if channels were ignored or "folded in"). This graph could be used for a people-rank algorithm to weigh the importance of each user differently depending on the number and type of followers they have for their channels (e.g. these people-rank weights could be used for votes, as described above).

In some embodiments, the video management system may allow a channel follower to receive alerts or other types of messaging updates for new content posted to that channel. Such messaging updates may include: video montage creations, likes, comments, shares, creations by another user using video montages/shots/templates currently in the followed channel, etc. Additionally, followers could stream live video or live video montages, adding them to a channel while they are being recorded. A channel could be publicly accessible or private to a specific group of people (including completely private to the channel owner only). Private channels could be a paid feature. Further, private channels could offer editing privileges to group members, which could allow them to add and edit content, on top of just being allowed to view/vote/reuse/repost content. A private channel for a small group with editing privilege could be used as a synchronous collaboration platform for a video project. This could be a good way to privately collaborate on a video project until it is finished and ready for public prime time. For larger groups (private or not), asynchronous video-curating and collaboration methods could be used. For example, an open channel could let a large number of people record and add video shots and video montages to it, with added voting mechanisms and collaborative video editing mechanisms. A live feed could be generated for this open channel by using voting data to select and stitch together only the most popular video shots and video montages in near real-time. In particular, this could be useful for venues that want a channel streaming a live video montage generated in real-time containing the best action happening at the venue. Venue patrons could be given extra curation and editing privileges to make sure that they always controlled the content being added to the channel. All user actions related to channels could be checked against a database of users in order to identify the source of those actions and potentially add spam prevention mechanisms.

In some embodiments, the video management system may add a search layer on top of all social video content, all interactions, all data from all mechanisms described above, and any other possible social video platform interaction. This could be done by indexing the content of all channels, all voting interactions, all bucket/category classifications, all views, all comments, all tags, all video montages, all associated sensor data and context dependent data, all other possible social video platform interaction data, etc. Among other things, the resulting search platform could be considered a searchable video footage library. For example, any public video shot could be used and reused by anybody (perhaps as long as copyright issues have been resolved). For example, if someone needed a nice sunset shot/montage/template for their video montage, they could do a search with the "sunset" keyword and find public and re-useable sunset video shots/montages/templates. By using counts from votes on these searchable items, it could be possible to rank the best shots/montages/templates for every keyword (or any combination of 2, 3, 4, etc. keywords) and present only the best video shots/montages/templates to the user doing a query (possibly also weighing votes with the people-rank algorithm described above to potentially increase the quality of search results). Any re-used shots/montages/templates in a video montage could point back to its original video montage and/or the user who created it or owns it.

In some embodiments, the video management system may add relevant metadata to the UI of the viewing client interface where users view or browse videos montages. Examples of viewing clients on electronic devices could be but are not limited to: a desktop browser, a laptop browser, a smartphone browser, a tablet browser, a smart-glass browser, a smart-phone browser, a smart-television browser, or a browser on any other type of electronic device, a desktop app, a laptop app, a smartphone app, a tablet app, a smart-glass app, a smart-phone app, a smart-television app, or an app on any other type of electronic device, or any type of user client operating on any type of electronic device. Metadata could be displayed for specific video shots, for video montages, or even for whole channels or buckets/categories. Examples of useful metadata that could be displayed on the viewing interface client could be but are not limited to the following: the location of where video was/is being recorded, the time of when video was/is being recorded, the description or name of any specific action occurring in the video, the description or name of anything, any object, any service or any experience identified in a video (for which examples have been listed above in video context-dependent metadata examples), the price of anything, any object, any service or any experience identified in a video (for which examples have been listed above in video context-dependent metadata examples), a list of providers or vendors for anything, any object, any service or any experience identified in a video (for which examples have been listed above in video context-dependent metadata examples), a written transcription or a written translation into any language of whatever has been said in a video, the name or tags of people in a video, the name of landmarks in a video, the name of events happening near the time or near the place where a video was/is being recorded, a description of a meme or template used for a video or of particular parts of a meme or template used for a video, the number of votes on each shot of a video that was/is being recorded (possibly with the video management system), in cases when a shot links to another video montage (see below), show the votes for the target video montage in order to help the viewer know if it is worth seeing the linked-to content, etc.

The short high-quality video shots created with the video management system may represent something specific and could be used as links to something (e.g. like a URL). Any user, regardless of if they were the original video creator or not, could create a link from a shot or group of shots toward additional video, information, interfaces, views, context, webpages, related action items, etc. The video montage summaries described above are examples of shots being used as links; every shot of a video montage summary could link to the original video montage it was from. There are many other examples of video shot links possible, some of which are described here.

A first example of links going from a shot to extra content is the following: a shot could link to an interface to buy or subscribe to whatever a shot represents. As mentioned above in the list of metadata that could be displayed in the viewing UI, any shot could display the name or description of any item, object, service or experience available for purchase or subscription. When the viewer tapped the video shot, tapped a description label displayed in that shot, or any more indicative portion of that shot, it could link directly to an interface to buy or subscribe to the item/object/service/experience. For example, a home decoration video montage may contain a shot focusing on a beautiful dining room table. If the viewer wanted to buy it, all they would need to do is tap (or click or otherwise make known with any other type of physical interaction) the player (e.g. viewed through a screen or eye projection electronic device) while viewing the shot of the table, tap the image of table in the shot, or tap a purchase description label or icon for the table appearing on the video shot of the table, and be instantly and seamlessly shown an interface to buy the table along with other relevant information.

A second example that uses these links are video templates where the template author suggests certain items with or without the video management system, as discussed above. For example, a template could be a video montage where each video shot provides instructions on or examples of what to record. This would make sure that the user(s) has all the relevant information and instructions to record the next few shots just before he/she/they started recording them. When a user recorded a shot as indicated, the shot in the video montage template could link to the newly recorded video shot. More generally, the template shot could then link to all the recorded "answer" shots, and users could vote on the best answers. Votes could be used to rank the shots best answering specific video template shots or rank the video montages best answering a video template (as mentioned briefly above with votes). Many other possible video template link examples are possible.

By adding links going from shots to extra content, a video montage could be made more interactive; at any point in time while viewing a video montage, the viewer could use a gesture to indicate that they want to act upon or see more content associated with any specific shot or group of shots. In particular, this target content could be video, and the transition to the target content could be made seamless and unobtrusive by smoothly inserting more video on the fly into the video montage being viewed. This would not be limited to a single layer of links (or any other number of layers of links), for example: a summary video shot could link to a summarized video montage, and shots in that video montage could themselves link to a subscribe interface, etc.

Figure 9:
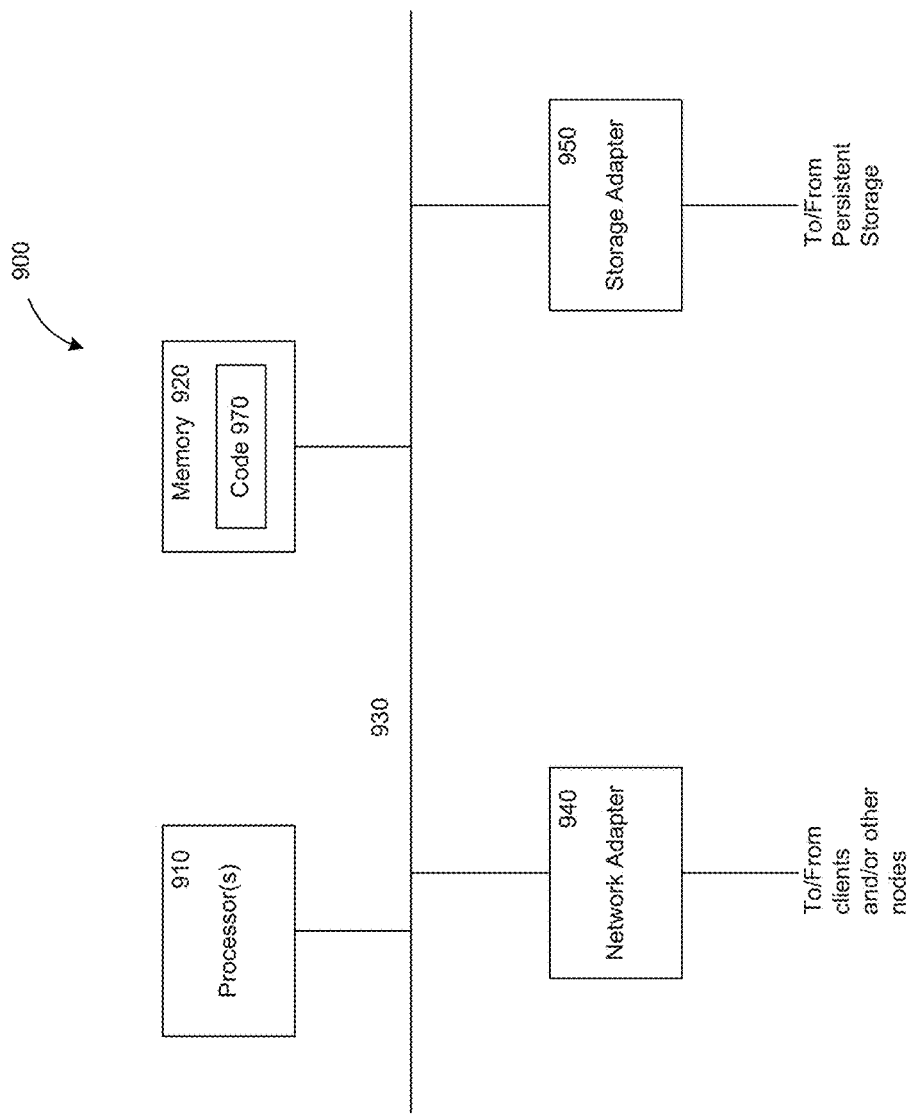
FIG. 9 contains a high-level block diagram showing an example architecture of a computer, which may represent any electronic device, any server, or any node within a cloud service as described herein.

FIG. 9 contains a high-level block diagram showing an example architecture of a computer, which may represent any electronic device, any server, or any node within a cloud service as described herein. The computer 900 includes one or more processors 910 and memory 920 coupled to an interconnect 930. The interconnect 930 shown in FIG. 9 is an abstraction that represents any one or more separate physical buses, point to point connections, or both connected by appropriate bridges, adapters, or controllers. The interconnect 930, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 910 is/are the central processing unit (CPU) of the computer 900 and, thus, control the overall operation of the computer 900. In certain embodiments, the processor(s) 910 accomplish this by executing software or firmware stored in memory 920. The processor(s) 910 may be, or may include, one or more programmable general-purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or the like, or a combination of such devices.

The memory 920 is or includes the main memory of the computer 900. The memory 920 represents any form of random access memory (RAM), read-only memory (ROM), flash memory, or the like, or a combination of such devices. In use, the memory 920 may contain code 970 containing instructions according to the techniques disclosed herein.

Also connected to the processor(s) 910 through the interconnect 930 are a network adapter 940 and a storage adapter 950. The network adapter 940 provides the computer 900 with the ability to communicate with remote devices over a network and may be, for example, an Ethernet adapter or Fibre Channel adapter. The network adapter 940 may also provide the computer 900 with the ability to communicate with other computers. The storage adapter 950 allows the computer 900 to access a persistent storage, and may be, for example, a Fibre Channel adapter or SCSI adapter.

The code 970 stored in memory 920 may be implemented as software and/or firmware to program the processor(s) 910 to carry out actions described above. In certain embodiments, such software or firmware may be initially provided to the computer 900 by downloading it from a remote system through the computer 900 (e.g., via network adapter 940).

CONCLUSION

The techniques introduced herein can be implemented by, for example, programmable circuitry (e.g., one or more microprocessors) programmed with software and/or firmware, or entirely in special-purpose hardwired circuitry, or in a combination of such forms. Software or firmware for use in implementing the techniques introduced here may be stored on a machine-readable storage medium and may be executed by one or more general-purpose or special-purpose programmable microprocessors.

In addition to the above mentioned examples, various other modifications and alterations of the invention may be made without departing from the invention. Accordingly, the above disclosure is not to be considered as limiting, and the appended claims are to be interpreted as encompassing the true spirit and the entire scope of the invention.

The various embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatuses, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

What is claimed is:

1. A method for creating a video template, comprising:
receiving, by a video management system, a first video montage from an electronic device while or after the first video montage is recorded;
dividing the first video montage into a plurality of video segments;
identifying metadata associated with video editing effects of the first video montage, wherein the metadata includes information regarding:
  background music of any of the video segments,
  muted background sound of any of the video segments,
  a time length of any of the video segments,
  a transition between any of the video segments,
  a slow motion effect of any of the video segments,
  a time freeze effect of any of the video segments,
  a filter of any of the video segments,
  a text overlay of any of the video segments,
  an image overlay of any of the video segments, or
  any combination thereof;
generating, by the video management system and while or after the first video montage is received, a video template based on the metadata and one or more transition points that separates the plurality of video segments, wherein the video template comprises video editing defaults corresponding to the metadata and wherein the video editing defaults define how to conform another plurality of video segments to the video template; and
communicating, by the video management system, the video template to a data storage of a social cloud platform.

2. The method of claim 1, wherein said generating the video template is responsive to receiving the first video montage.

3. The method of claim 1, further comprising:
receiving a search query for one or more video templates stored on the social cloud platform from another electronic device; and
in response to the video template corresponding to the search query, transmitting the video template to the another electronic device.

4. The method of claim 1, further comprising:
receiving, from another electronic device, the another plurality of video segments while or after the another plurality of video segments is recorded;
generating a recommendation on creating another video montage based on the video template and the another plurality of video segments; and
transmitting the generated recommendation to the another electronic device.

5. The method of claim 1, further comprising:
receiving, from another electronic device, the another plurality of video segments while or after the another plurality of video segments is recorded;
creating another video montage based on the video template and the another plurality of video segments; and
communicating, by the video management system, the another video montage to storage of the social cloud platform.

6. The method of claim 5, further comprising:
receiving feedback provided by a viewer from the social cloud platform, wherein the feedback includes appreciation or comment regarding the another video montage; and
transmitting the feedback to the electronic device.

7. The method of claim 1, wherein the video editing defaults include:
  background music for any of the video segments,
  muted background sound for any of the video segments,
  a time length for any of the video segments,
  a transition between any of the video segments,
  a slow motion effect for any of the video segments,
  a time freeze effect for any of the video segments,
  a filter for any of the video segments,
  a text overlay for any of the video segments,
  an image overlay for any of the video segments, or
  any combination thereof.

8. The method of claim 1, wherein the video management system is part of the social cloud platform.

9. The method of claim 1, wherein the video management system is independent from the social cloud platform.

10. The method of claim 1, wherein the electronic device is a laptop, a desktop, a cellular phone, a wearable device, a tablet, a television, a video camera, or any combination thereof.

11. A method for creating a video template, comprising:
receiving, by a video management system, a first video montage from an electronic device while or after the first video montage is recorded;
dividing the first video montage into a plurality of video segments;
identifying metadata associated with video editing effects of the first video montage;
generating, by the video management system and while or after the first video montage is received, a video template based on the metadata and one or more transition points that separates the plurality of video segments, wherein the video template comprises video editing defaults corresponding to the metadata and wherein the video editing defaults define how to conform another plurality of video segments to the video template, wherein the video editing defaults include:
  background music for any of the video segments,
  muted background sound for any of the video segments,
  a time length for any of the video segments,
  a transition between any of the video segments,
  a slow motion effect for any of the video segments,
  a time freeze effect for any of the video segments,
  a filter for any of the video segments,
  a text overlay for any of the video segments,
  an image overlay for any of the video segments, or
  any combination thereof; and
communicating, by the video management system, the video template to a data storage of a social cloud platform.

* * * * *